(12) United States Patent
Copic et al.

(10) Patent No.: US 10,482,665 B2
(45) Date of Patent: Nov. 19, 2019

(54) SYNCHING AND DESYNCING A SHARED VIEW IN A MULTIUSER SCENARIO

(71) Applicant: MICROSOFT TECHNOLOGY LICENSING, LLC, Redmond, WA (US)

(72) Inventors: John Michael Copic, Redmond, WA (US); Jonathan Paulovich, Redmond, WA (US); Jedd Alexander Chevrier, Redmond, WA (US); Ryan Lucas Hastings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 15/382,051

(22) Filed: Dec. 16, 2016

(65) Prior Publication Data
US 2018/0174364 A1    Jun. 21, 2018

(51) Int. Cl.
*G06T 19/00* (2011.01)
*H04N 5/04* (2006.01)
(Continued)

(52) U.S. Cl.
CPC ............ *G06T 19/006* (2013.01); *G06F 3/011* (2013.01); *G06F 3/1423* (2013.01); *G06T 2219/024* (2013.01); *G09G 2340/045* (2013.01)

(58) Field of Classification Search
CPC .. G06K 9/00664–00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | | | |
|---|---|---|---|---|---|
| 5,515,491 | A | * | 5/1996 | Bates | G06F 3/0481 715/754 |
| 6,167,433 | A | * | 12/2000 | Maples | G06F 9/451 709/204 |

(Continued)

FOREIGN PATENT DOCUMENTS

WO    2016135450 A1    9/2016

OTHER PUBLICATIONS

"Shared holographic experiences", https://developer.microsoft.com/en-us/windows/holographic/shared_holographic_experiences, Retrieved on: Sep. 28, 2016, 5 pages.

(Continued)

*Primary Examiner* — Todd Buttram
(74) *Attorney, Agent, or Firm* — Workman Nydegger (57) ABSTRACT

Systems are provided for synchronizing and desynchronizing mixed-reality datasets between multiple devices. The systems identify multiple users in a mixed-reality environment. The mixed-reality environment is defined by a global mixed-reality dataset. The systems display a synchronized view of the global mixed-reality dataset to each of the multiple users within a shared coordinate system. Additionally, the systems receive a command from a first user within the multiple users to desynchronize from the multiple users. The systems display to the first user a first desynchronized view of the global mixed-reality dataset.

20 Claims, 6 Drawing Sheets

(51) Int. Cl.
*G06F 3/14* (2006.01)
*G06T 19/20* (2011.01)
*G06F 3/01* (2006.01)

(56) References Cited

U.S. PATENT DOCUMENTS

| | | | |
|---|---|---|---|
| 6,195,184 B1 | 2/2001 | Chao et al. | |
| 9,041,739 B2 | 5/2015 | Latta et al. | |
| 2007/0032945 A1* | 2/2007 | Kaufman | G01C 21/20 701/532 |
| 2009/0119604 A1 | 5/2009 | Simard et al. | |
| 2011/0216002 A1* | 9/2011 | Weising | G09G 5/08 345/158 |
| 2012/0249741 A1* | 10/2012 | Maciocci | G06F 3/011 348/46 |
| 2013/0135180 A1 | 5/2013 | Mcculloch et al. | |
| 2013/0293468 A1 | 11/2013 | Perez et al. | |
| 2014/0285519 A1 | 9/2014 | Uusitalo et al. | |
| 2014/0368537 A1 | 12/2014 | Salter et al. | |
| 2015/0123966 A1* | 5/2015 | Newman | G06T 19/006 345/419 |
| 2015/0145883 A1* | 5/2015 | Marti | G09G 3/20 345/592 |
| 2016/0110152 A1* | 4/2016 | Choi | G06F 3/04817 345/2.3 |
| 2017/0149854 A1* | 5/2017 | Dove | H04L 65/403 |

OTHER PUBLICATIONS

Puiu, Tibi, "New interactive military holographic 3D map by DARPA", http://www.zmescience.com/research/new-interactive-military-holographic-3d-map-by-darpa-3214344/, Mar. 29, 2011, 3 pages.

Prigg, Mark, "US military bosses reveal plans for holographic 'space warfare command' that can monitor Everything orbiting the Earth", http://www.dailymail.co.uk/sciencetech/article-3651468/US-military-bosses-reveal-plans-holographic-space-command-monitor-orbiting-Earth.html, Jun. 20, 2016, 3 pages.

Axe, David, "Military One Step Closer to Battlefield Holograms", https://www.wired.com/2010/12/military-one-step-closer-to-battlefield-holograms/, Dec. 6, 2010, 2 pages.

Grasset, et al. "Navigation Techniques in Augmented and Mixed Reality: Crossing the Virtuality Continuum", In Publication of Springer, Jul. 13, 2011, 29 pages.

Suma, et al. "Sharing Space in Mixed and Virtual Reality Environments Using a Low-Cost Depth Sensor", In Proceedings of IEEE International Symposium on Virtual Reality Innovation, Mar. 19, 2011, pp. 353-354.

\* cited by examiner

SYNCHING AND DESYNCING A SHARED VIEW IN A MULTIUSER SCENARIO

BACKGROUND

Computer systems have grown to permeate nearly every aspect of day-to-day life. In the earlier days of computers, a desktop metaphor was chosen as a scheme through which users would interact with their computers. Due to this metaphor, many modern computers now have a desktop, folders, and files. As computer technology advanced so did the means by which users interact with computers. More recent innovations in computer interaction include voice commands, vision tracking, predictive interactions, and various other schemes that are far removed from the original desktop metaphor.

Mixed-reality computer systems have recently received significant interest for their ability to create immersive experiences for users. Mixed-reality systems include virtual reality, augmented reality, and other systems that incorporate virtual elements into a real-world environment. Through mixed-reality a user is immersed fully or partially within a virtual world. Additionally, mixed-reality devices include heads-mounted displays (HMDs), including opaque displays of the type used in fully immersive virtual reality and transparent displays of the type used in partially immersive augmented reality.

One particular interest in mixed-reality applications is the ability for multiple users to have common shared experiences within a shared mixed-reality environment. For example, a first user may create a mixed-reality environment that is then shared among multiple different users. Each user may wish to interact with the shared mixed-reality environment. Managing multiple different users within the same environment presents several unique technical challenges that are not addressed by the desktop metaphor or any other interaction technology.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise systems, methods, and apparatus configured to manage multiple users within a shared mixed-reality environment. Users are provided with the ability to desynchronize from a shared global view of a mixed-reality environment. The desynchronized users are able to manipulate their view of the mixed-reality environment and manipulate the mixed-reality environment. The users are then capable of rejoining the synchronized global view of the mixed-reality environment.

Disclosed embodiments include systems, methods, and apparatus for synchronizing and desynchronizing mixed-reality datasets between multiple devices. The systems, methods, and apparatus include identifying multiple users in a mixed-reality environment. The mixed-reality environment is defined by a global mixed-reality dataset. The systems, methods, and apparatus also include displaying a synchronized view of the global mixed-reality dataset to each of the multiple users within a shared coordinate system. Additionally, the systems, methods, and apparatus include receiving a command from a first user within the multiple users to desynchronize from the multiple users. The systems, methods, and apparatus further include displaying to the first user a first desynchronized view of the global mixed-reality dataset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Disclosed embodiments comprise systems, methods, and apparatus configured to manage multiple users within a shared mixed-reality environment. For example, disclosed embodiments allow multiple users to share a common mixed-reality environment. Within the shared mixed-reality environment, all of the users view the same content and are able to collaborate based upon the same three-dimensional dataset. As a user changes aspects or views of the mixed reality dataset, all of the other users also see and experience the change. For example, a user may choose to zoom in on a particular portion of a mixed-reality environment. In such a case, all of the other users would also be zoomed into the same portion.

In contrast, disclosed embodiments allow multiple users to share a synchronized global dataset of three-dimensional information, while one or more users view a desynchronized view of the same global dataset. The desynchronized users are able to manipulate data within the desynchronized view independent of the synchronized users. For example, a desynchronized user is able to zoom into any portion of the three-dimensional environment without impacting the other users.

Disclosed embodiments provide solutions to unique and emerging technical problems relating to user interactions and user interfaces within mixed-reality environments. The desktop metaphor has functioned well within user interfaces on desktop computers for many years. However, mixed-reality environments are far more feature rich and complex than the conventional two-dimensional display used on conventional computers. Disclosed embodiments provide solutions to one or more technical problems relating to user interactions with mixed-reality environments. For instance, disclosed embodiments provide frameworks through which a common three-dimensional data set can be shared between multiple users in a collaborative relationship.

Figure 1:
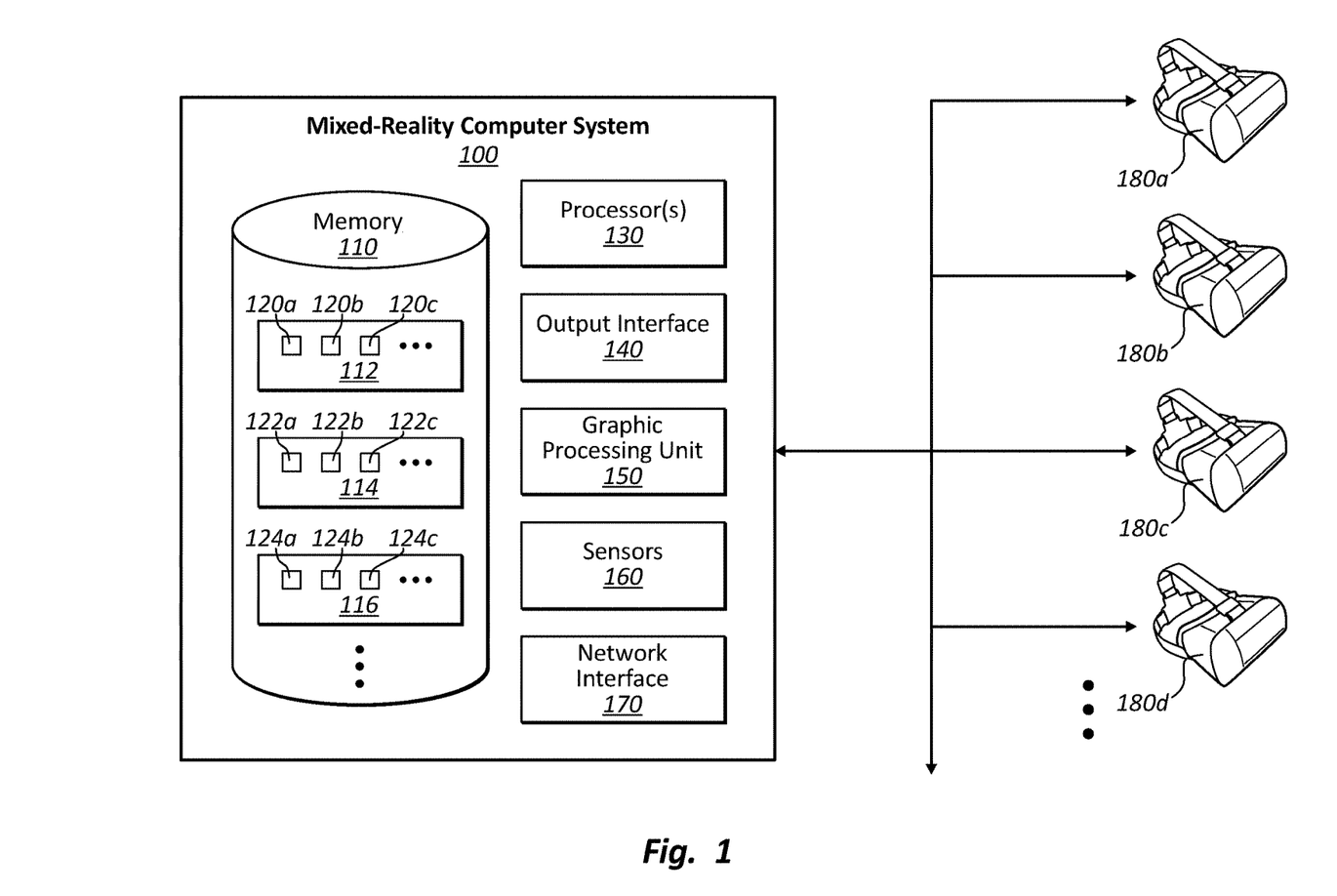
FIG. 1 illustrates a schematic view of an embodiment of a computer system for synchronizing and desynchronizing mixed-reality datasets between multiple devices.

For example, FIG. 1 illustrates a schematic view of an embodiment of a computer system for synchronizing and desynchronizing mixed-reality datasets between multiple devices. FIG. 1 depicts a mixed-reality computer system 100 in communication with various mixed-reality devices 180 (a-d). The depicted mixed-reality devices 180(a-d) comprise any device capable of rendering virtual content in a mixed-reality environment, including augmented-reality environments, virtual-reality environments, or any other immersive three-dimensional environment. Augmented reality is typically defined as virtual content that overlays the user's real-world view. In at least one embodiment, mixed-reality device 180a comprises a wearable heads-up display, also know as a head mounted display (HMD).

The mixed-reality computer system 100 communicates a three-dimensional dataset to each of the mixed-reality devices 180(a-d). In various additional or alternative embodiments, the mixed-reality computer system 100 comprises a single unitary computer system or multiple distributed computer systems. For example, the mixed-reality computer system 100 may be distributed, at least in part, across a network through a network interface 170 and among processing units within each mixed-reality device 180(a-d). The components, configuration, and description of the mixed-reality computer system 100 and associated modules depicted herein are provided for the sake of explanation and clarity. Various additional or alternative embodiments may comprise modules that are otherwise combined, divided, named, or described.

The mixed-reality computer system 100 comprises memory 110, processors 130, an output interface 140, a graphics processing unit 150, sensors 160, and a network interface 170. In at least one embodiment, the memory 110 comprises a global mixed-reality dataset 112. The global mixed-reality dataset 112 comprises data that describes a mixed-reality environment such that it can be rendered to one or more users. Additionally, the global mixed-reality dataset 112 also comprises various view variables 120(a-c) that describe user adjustable aspects of the mixed-reality environment, such as zoom, perspective, filters, resolutions, and other similar attributes.

In at least one embodiment, the mixed-reality computer system 100 identifies multiple users in a mixed-reality environment. The multiple users are each associated with a mixed-reality device 180(a-d). The mixed-reality environment is defined by the global mixed-reality dataset 112. The global mixed-reality dataset 112 comprises information relating to the three-dimensional information that will be rendered to each user. For example, the global mixed-reality dataset 112 may comprise data necessary to render a three-dimensional map or to render an automobile.

Using the information within the global mixed-reality dataset 112, the mixed-reality computer system 100 causes the mixed-reality devices 180(a-d) to display a synchronized view of the global-mixed reality dataset 112 to each of the multiple users within a shared coordinate system. As used herein, a synchronized view of a global-mixed reality dataset 112 comprises a view within an associated mixed-reality environment where synchronized users view the same renderings of the data within the global-mixed reality dataset 112. For example, if the global-mixed reality dataset 112 comprises data necessary to render a three-dimensional map, the users within the synchronized view are displayed the same renderings of a three-dimensional map. While each user may have a unique perspective on the renderings of the three-dimensional map, the synchronized users view the same content on a common coordinate system.

In at least one embodiment, the common coordinate system is based upon one or more common anchor points within the physical world. For example, the multiple users may all be surrounding a table. The table itself may serve as a common anchor point or may comprise a design or image on the surface of the table that serves as a common anchor point. As used herein, a common anchor point is a physical object or item upon which a mixed-reality environment can base its coordinate system.

In at least one embodiment, each mixed-reality device 180(a-d) independently identifies the common anchor point. Using a combination of processors 130 and/or graphics processing units 150 within the mixed reality computer system 100 and or within each mixed-reality device 180, each mixed-reality device renders for its user the mixed-reality environment on a common coordinate system using the common anchor point. In at least one additional or alternative embodiment, the mixed-reality computer system 100 comprises sensors 160 that are separate from the mixed-reality devices 180. For example, a sensor 160, in the form of a camera, may be positioned within the same physical room as the mixed-reality anchor point. The mixed-reality computer system 100 can utilize the camera to identify the common anchor point and assist in rendering the mixed-reality environment on a common coordinate system based upon the common anchor point.

Using the common anchor point, processor(s) 130 and graphics processing units 150 within the mixed-reality computer system 100 render a mixed-reality environment such that the mixed-reality environment is rendered with the same orientation with respect to the physical world as viewed by each of the multiple users. For example, the mixed-reality rendering of the three-dimensional map may be rendered to each of the multiple users such that the map is correctly aligned with north and each of the users view the content laid out in the same way within the physical world.

The common coordinate system provides significant benefits to users operating within a collaborative, synchronized environment. For instance, if the mixed-reality environment was rendered using separate coordinate systems for each user, the users may not see the content laid out in the same way. A first user may wish to point out a portion of the three-dimensional content, but a second user may be viewing the content laid-out on a different coordinate system within the physical world. As such, rendering the mixed-reality environment on a common coordinate system allows the users to collaboratively interact with the mixed-reality environment.

In at least one embodiment, the mixed-reality computer system 100 receives a command from a mixed-reality device 180b to desynchronize from the other synchronized users. In response to receiving the command, the mixed-reality computer system 100 creates a first desynchronized mixed-reality dataset 114. The first desynchronized mixed-reality dataset 114 comprises its own set of various view variables 122(a-c). In various additional or alternative embodiments, the first desynchronized mixed-reality dataset 114 comprises a complete copy of the global mixed-reality dataset 112, a partial copy of the global-mixed reality data set 112, only the various view variables 122(a-c), or some other configuration of the global mixed-reality dataset 112.

Using the first desynchronized mixed-reality dataset 114, the mixed-reality computer system 100 displays through the mixed-reality device 180b a first desynchronized view of the global mixed-reality dataset 112. As used herein, a desynchronized view comprises a view of the same content within the global mixed-reality dataset 112, but with the capability of, independent from the synchronized users, viewing additional data, viewing less data, viewing different data, or manipulating the data.

In at least one embodiment, one or more attributes of a desynchronized view are defined by settings for the set of view variables 122(a-c). Similarly, one or more attributes of the synchronized view are defined by different settings for the view variables 120(a-c). For example, view variables 120a and 122a may be associated with a particular filter that is applicable to the mixed-reality environment. The desynchronized user is capable of changing the value of view variable 122a independent of the synchronized users. As such, the desynchronized mixed-reality device 180b displays the same mixed-reality environment viewed by the synchronized users, but the desynchronized mixed-reality device 180b applies a unique filter to the mixed-reality environment so that the desynchronized user can view the mixed-reality environment differently. In contrast, if a synchronized user changes the value of view variable 120a to change the filter, then the filter is changed for all of the synchronized users.

Figure 2:
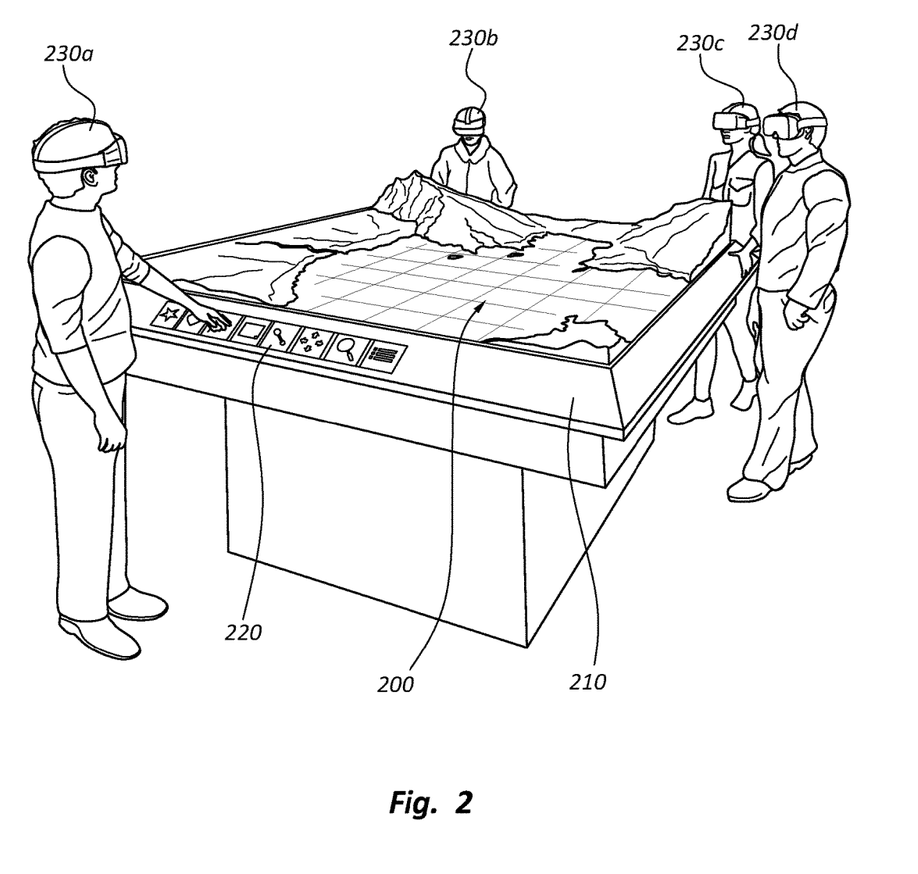
FIG. 2 illustrates a view of an embodiment of multiple users working within a shared mixed-reality environment.

Turning now to FIG. 2, FIG. 2 illustrates a view of an embodiment of multiple users 230(a-d) working within a shared mixed-reality environment 200. The mixed-reality environment 200 is rendered on top of a table 210. As depicted, multiple, different synchronized views are present simultaneously within the mixed-reality environment. For example, user 230a views the mixed-reality environment 200 through his own mixed-reality device (e.g., 180a), while user 230b views the mix-reality environment 200 through her own mixed-reality device (e.g., 180b). As such, the mixed-reality environment 200 is independently rendered by each user's mixed-reality device, but a common mixed-reality environment 200 is displayed to all of the synchronized users.

As explained above, a common anchor point allows the multiple users to share a collaborative view of the same mixed-reality environment. In at least one embodiment, the common anchor point is the table 210. As such, the mixed-reality computer system 200 identifies the common anchor point, in this example the table 210, within a room that contains at least a portion of the multiple users 230(a-d).

In at least one embodiment, the synchronized view of the mixed-reality environment 200 comprises a single visual control panel 220 common to all users 230(a-d) sharing the synchronized view. For example, user 230d would have to walk around the table 210 to the single visual control panel 220 in order to manipulate the mixed-reality environment 200. In at least one embodiment, providing a single visual control panel 220 prevents the users 230(a-d) from simultaneously manipulating the mixed-reality environment 200 in a way that creates conflicts.

In at least one additional or alternative embodiment, multiple visual control panels are positioned around the mixed-reality environment 200. For example, each user may have a personal visual control panel that is present within their field-of-view. The personal visual control panel may move with the user as they move around the room. In various additional or alternative embodiments, the personal visual control panel may or may not be visible to the other users.

Figure 3:
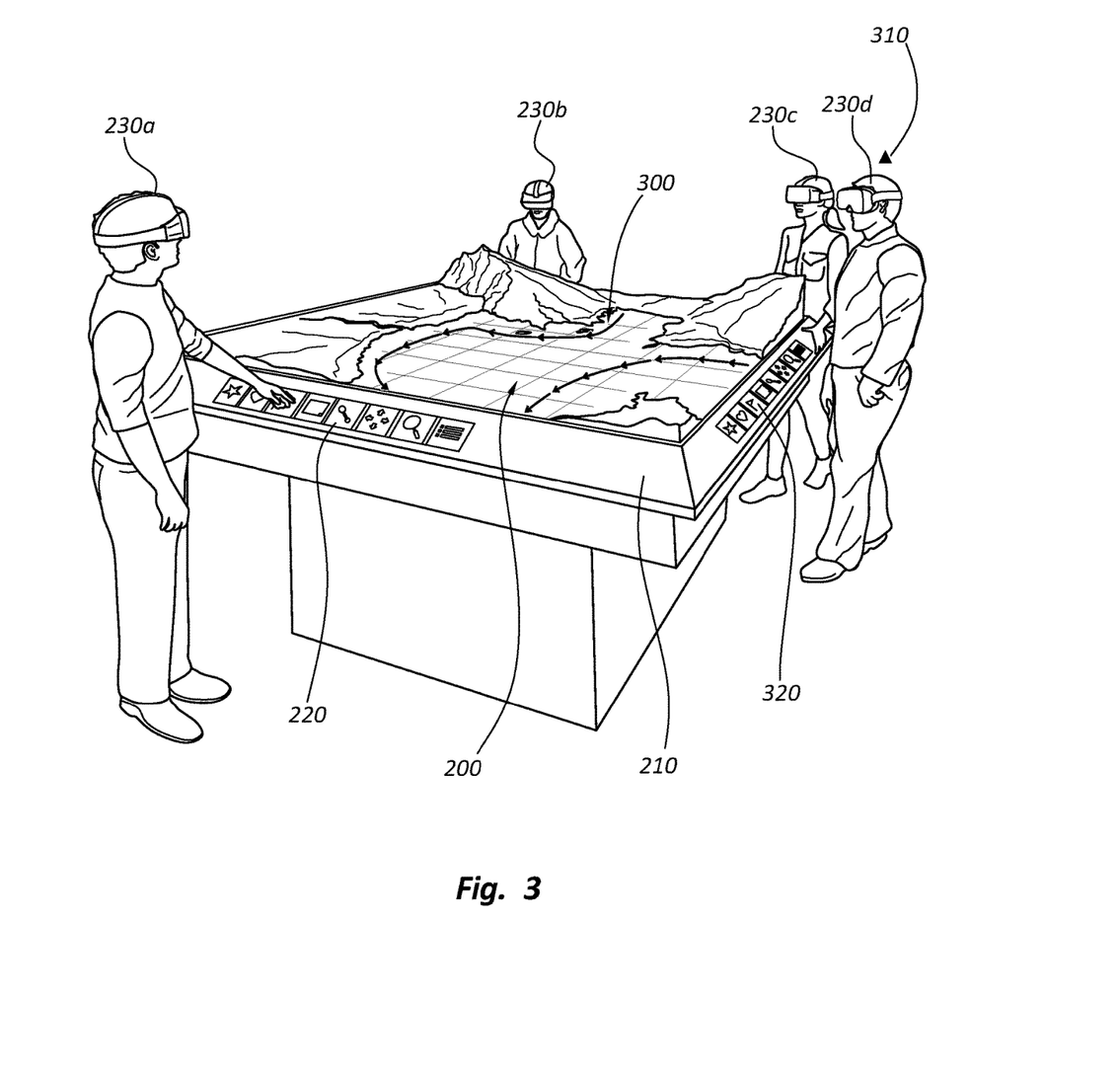
FIG. 3 illustrates a view of another embodiment of multiple users working within a shared mixed-reality environment.

FIG. 3 illustrates a view of another embodiment of multiple users 230(a-d) working within a shared mixed-reality environment 200. In the depicted embodiment, user 230d has desynchronized from the global mixed-reality data set 112. As explained above, when user 230d desynchronizes from the global mixed-reality data set 112, the mixed-reality computer system 100 creates a first desynchronized mixed-reality dataset 114 that contains view variables 122(a-c) that describe the desynchronized view.

In at least one embodiment, the desynchronized user 230d views the same mixed-reality environment as the other users 230(a-d), but the desynchronized view of the mixed-reality environment 200 comprises view variables 122(a-c) that are different than the ones associated with the synchronized users. For example, the desynchronized view may comprise a three-dimensional view that is based upon the data within the global mixed-reality data set but with a different data filter than is set by the view variables 120(a-c) for the synchronized users.

For instance, desynchronized user 230d has set a filter that shows tidal flows 300 within the mixed-reality environment 200. The tidal flows 300 may be associated with a particular filter in the mixed-reality environment 200 that is visible to the desynchronized user 230d but not to the synchronized users 230(a-c) due to differences between view variables 120(a-c), 122(a-c). In at least one embodiment, desynchronized user 230d is provided with a desynchronized control panel 320 that allows the desynchronized user 230d to control aspects of the mixed-reality environment independent of the synchronized users 230(a-c). Additionally, in at least one embodiment, user 230d can also make physical changes to the mixed-reality environment 200, such as changing the boundaries of the ocean, that are only visible to him within the desynchronized view.

In at least one embodiment, a visual indication 310 is used to distinguish between synchronized and desynchronized users. For example, synchronized users 230(a-c) see a visual indication 310 associated with desynchronized user 230d. In the depicted figure, the visual indication 310 comprises a triangle over the desynchronized user's head. One will understand, however, that the shape is provided for the sake of example and explanation. In additional or alternative embodiments, the visual indicator 310 may comprise a list of names that are visible to each user 230(a-d). The list of names may explicitly list users in a de-synchronized view. In additional or alternative embodiments, various other indicators can be used to distinguish between synchronized and desynchronized users. Accordingly, synchronized users 230 (a-c) are easily able to identify other users within the same mixed-reality environment 200 who are within desynchronized views.

Additionally, in at least one embodiment, synchronized users 230(a-c) are presented with a second visual indication within the mixed-reality environment 200 that indicates the portion of the mixed-reality environment with which the desynchronized user 230d is interacting. For example, the synchronized users 230(a-c) may be presented with a visual indicator associated with the body of water that indicates that the desynchronized user 230d is interacting with the body of water. Presenting the visual indicator does not necessarily comprise presenting the same information that the desynchronized user 230d is viewing within the desynchronized view. Instead, in at least one embodiment, the visual indicator may merely provide the synchronized users 230(a-c) with a notice that the indicated portion of the mixed-reality environment 200 may be modified by the desynchronized user 230d.

Additionally, in at least one embodiment, the second visual indicator comprises a visual depiction of a user's location within the mixed-reality environment 200. For example, a particular desynchronized user may zoom into a portion of a mixed-reality environment 200, such as a map, to the point that the features of the map are rendered around the desynchronized user at true scale. For instance, the desynchronized user may zoom in to a mixed-reality map of a city such that the desynchronized user is placed within a mixed-reality environment 200 that represents the true size and scale of a road within the city. In such a case, the other users may view the second visual indication in the form of a rendering of a person standing on the street within their view of the mixed-reality environment 200. As such, the synchronized users view the desynchronized user as if he were standing on the same street that is being rendered to the desynchronized user at scale.

In at least one embodiment, the mixed-reality computer system 100 receives a command from the desynchronized user 230d within the desynchronized view to resynchronize with the synchronized users 230(a-c). Upon receiving the command, the mixed-reality computer system 100 displays to user 230d the synchronized view of the global mixed-reality data set 112.

In at least one embodiment, resynchronizing user 230d with the synchronized users 230(a-c) comprises incorporating one or more view variables 122(a-c) from the first desynchronized mixed-reality data set 114 into view variables 120(a-c) within the global mixed reality dataset 112. For example, while desynchronized, user 230d may have adjusted a feature relating to the water in the three-dimensional map. In some cases, as will be explained below, the adjustments made by user 230d are incorporated into the global mixed-reality dataset 112.

Figure 4:
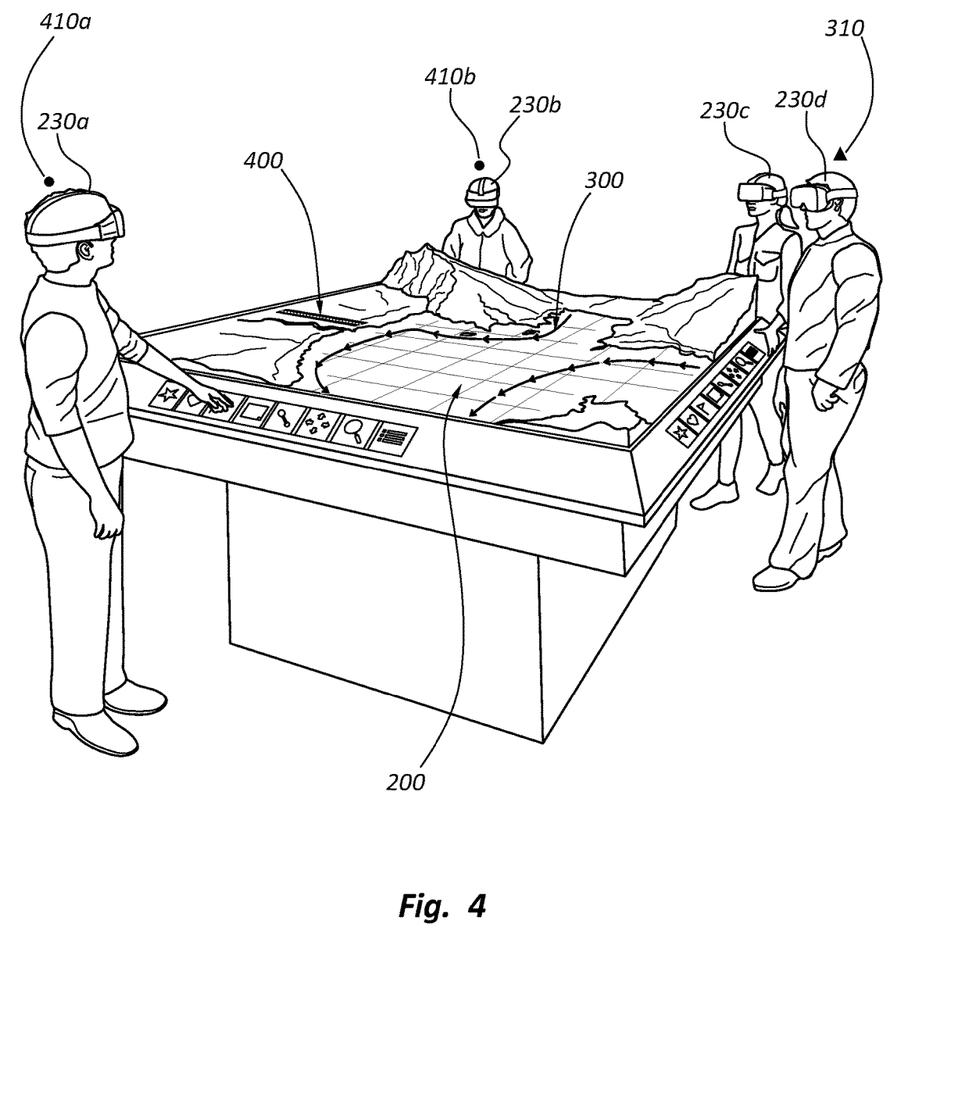
FIG. 4 illustrates a view of yet another embodiment of multiple users working within a shared mixed-reality environment.

FIG. 4 illustrates a view of yet another embodiment of multiple users 230(a-d) working within a shared mixed-reality environment 200. In FIG. 4, user 230d is desynchronized from the global mixed-reality dataset 112 as indicated by the visual indication 310 above the user's head. Additionally, users 230b and 230a are also desynchronized from the global mixed-reality dataset 112 as indicated by the visual indications 410a, 410b above users 230a and 230b.

In the depicted embodiment, users 230a and 230b are sharing the same desynchronized view—as indicated by the common visual indications 410a, 410b above each user's head. In at least one embodiment, after user 230a desynchronizes from the global mixed-reality dataset 112, user 230b also desynchronizes, but instead of creating a new desynchronized dataset, user 230b chooses to join the same desynchronized view and desynchronized dataset as user 230a. Upon desynchronizing, visual indicators 410a, 410b, in this case a circle, appears above users 230a and 230b. As such, the other users within the mixed-reality environment 200 can look at users 230a and 230b and identify that they are sharing a desynchronized view based upon the visual indicators 410a, 410b.

Additionally, in at least one embodiment, user 230a also desynchronizes from the global mixed-reality dataset 112. The mixed-reality computer system 100 creates another desynchronized mixed-reality dataset 116 that comprises its own set of various view variables 124(a-c). As such, in various embodiments, multiple desynchronized mixed-reality datasets 114, 116 exist simultaneously within a single mixed-reality environment 200.

In at least one embodiment, every user within the mixed-reality environment 200 can be within a desynchronized view, such that no user is directly associated with the global mixed-reality dataset 112. In at least one embodiment, the global mixed-reality dataset 112 comprises the underlying data that defines the mixed-reality environment 200, while each desynchronized view is associated with a desynchronized mixed-reality dataset (e.g. 114, 116) that contains view variables to define various data filters, view perspectives, view attributes (e.g., zoom), and in some embodiments manipulations that the desynchronized user has made to the mixed-reality environment 200.

In at least one embodiment, the manipulations made by a user within a desynchronized view are not incorporated into the global mixed-reality dataset 112 until the desynchronized user resynchronizes with the global mixed-reality dataset 112. Further, in at least one embodiment permissions and rules are applied to the global mixed-reality dataset 112 that also distinguish it from the desynchronized mixed-reality sets (e.g., 114, 116). For example, in at least one embodiment, a desynchronized user is free to change, delete, add to, or otherwise manipulate the mixed-reality environment 200 in any way. In contrast, the global mixed-reality dataset 112 is configurable to only allow specific changes to specific data from specific users.

For instance, user 230d may be an oceanographer, while user 230b may be a geologist. In at least one embodiment, while in a desynchronized view, user 230d is able to manipulate any aspect of the mixed-reality environment, including geological aspects of the three-dimensional map. However, the global mixed-reality dataset 112 may apply rules that only allow changes made by user 230d to the ocean-aspects of the three-dimensional map to be incorporated into the global-mixed reality dataset 112. In contrast, the global mixed-reality dataset 112 may comprise rules that allow user 230b to manipulate geological-aspects of the three-dimensional map, but prohibit user 230b from manipulating ocean-aspects of the three-dimensional map.

Further, in at least one embodiment to prevent conflicts within the global mixed-reality dataset 112, the mixed-reality computer system 100 locks variables associated with a particular portion of the mixed-reality environment from being edited by any user other than user 230d. For example, whenever a user within a desynchronized view interacts with a particular portion of the mixed-reality environment, the mixed-reality computer system 100 locks the variables related to that portion so that no other users can concurrently manipulate the variables. Additionally, the mixed-reality computer system 100 causes an indication to appear in association with the locked portion of the mixed-reality environment 200. For instance, the mixed-reality computer system 100 may display a user specific color over the portion of the mixed-reality environment 200 that each user is manipulating.

In at least one embodiment when within a shared desynchronized view, both users 230b, 230d are able to freely manipulate the mixed-reality environment, and in turn the associated view variables 124(a-c). Additionally, in at least one embodiment, when the shared desynchronized view is resynchronized with the global mixed-reality dataset 112, the rules for the global mixed-reality dataset 112 are applied jointly to the permissions of users 230b, 230d. For example, any changes made to either geological-aspects or ocean-aspects of the three-dimensional map will be incorporated into the global mixed-reality dataset 112, regardless of which user made the change.

Accordingly, in at least one embodiment, a shared desynchronized view can be used to collaborate with another user within the mixed-reality environment 200. For example, two users 230b, 230d may wish to work together on some aspects of the three-dimensional map that relate to both ocean-aspects and geology. As such, the two users 230b, 230d can join a shared desynchronized view and make the necessary changes collaboratively, which will then be incorporated into the global-mixed reality view.

Figure 5:
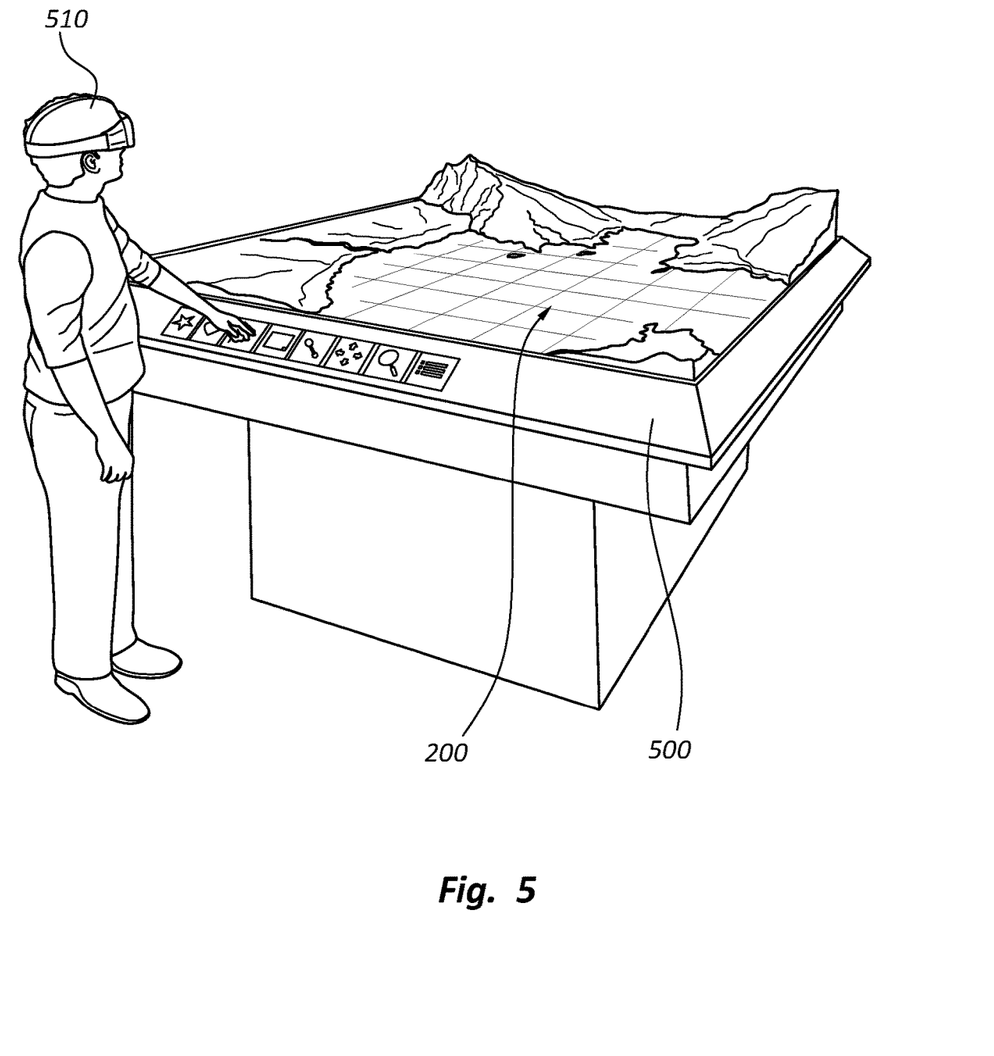
FIG. 5 illustrates a view of an embodiment of a remote user working within a shared mixed-reality environment.

FIG. 5 illustrates a view of an embodiment of a remote user 510 working within the shared mixed-reality environment 200 described above. In at least one embodiment, a remote user 510 joins the mixed-reality environment 200 and is capable of interacting with the other users as if they were in the same room as the other users. For example, as explained above the mixed-reality computer system 100 identifies a first common anchor point (e.g., the table 210 shown in FIG. 2) within a first room that contains the multiple users 230(a-d). The mixed-reality computer system 100 then identifies a second common anchor point, such as table 500. While tables 210, 500 are used as anchor points in this description, in various embodiments, the anchor points can comprise any object that provides the mixed-reality computer system 200 with an indication of scale and an indication of orientation necessary to generate a common coordinate system. As such, the common anchor points can comprise different objects in different locations.

Upon identifying the common anchor points, the mixed-reality computer system 100 displays the synchronized view of the global mixed-reality dataset 112 to the users 230(a-d), 510 within the shared coordinate system. The shared coordinate system for a first portion of the multiple users (e.g., users 230(a-d)) is associated with the first common anchor point 210 and for a second portion of the multiple users (e.g., user 510) is associated with the second common anchor point 500. Accordingly, in at least one embodiment, a shared coordinate system comprises a coordinate system that provides users with a common scale and orientation for a mixed-reality environment. However, a shared coordinate system can be used to generate a mixed-reality environment 200 in multiple different locations. For example, in at least one embodiment, user 510 is in the same room as users 230(a-d), but is standing next to a different table 500. In contrast, user 510 may also be hundreds or thousands of miles away from users 230(a-d) and still sharing the same mixed-reality environment 200.

One will understand that the ability to share a mixed-reality environment 200 among local and/or remote multiple users with a shared coordinate system provides significant flexibility to the users. For example, a particular project may involve hundreds of users. It would be impractical to put hundreds of users around a single table to interact together. Instead, disclosed embodiments allow the users to work together around multiple different tables within the same room, multiple different tables within the same building, or tables located anywhere in the world.

One will appreciate that embodiments disclosed herein can also be described in terms of flowcharts comprising one or more acts for accomplishing a particular result. For example, FIG. 6 and the corresponding text describe acts in various systems for performing methods and/or stand-alone methods for synchronizing and desynchronizing mixed-reality datasets between multiple devices. The acts of FIG. 6 are described below.

Figure 6:
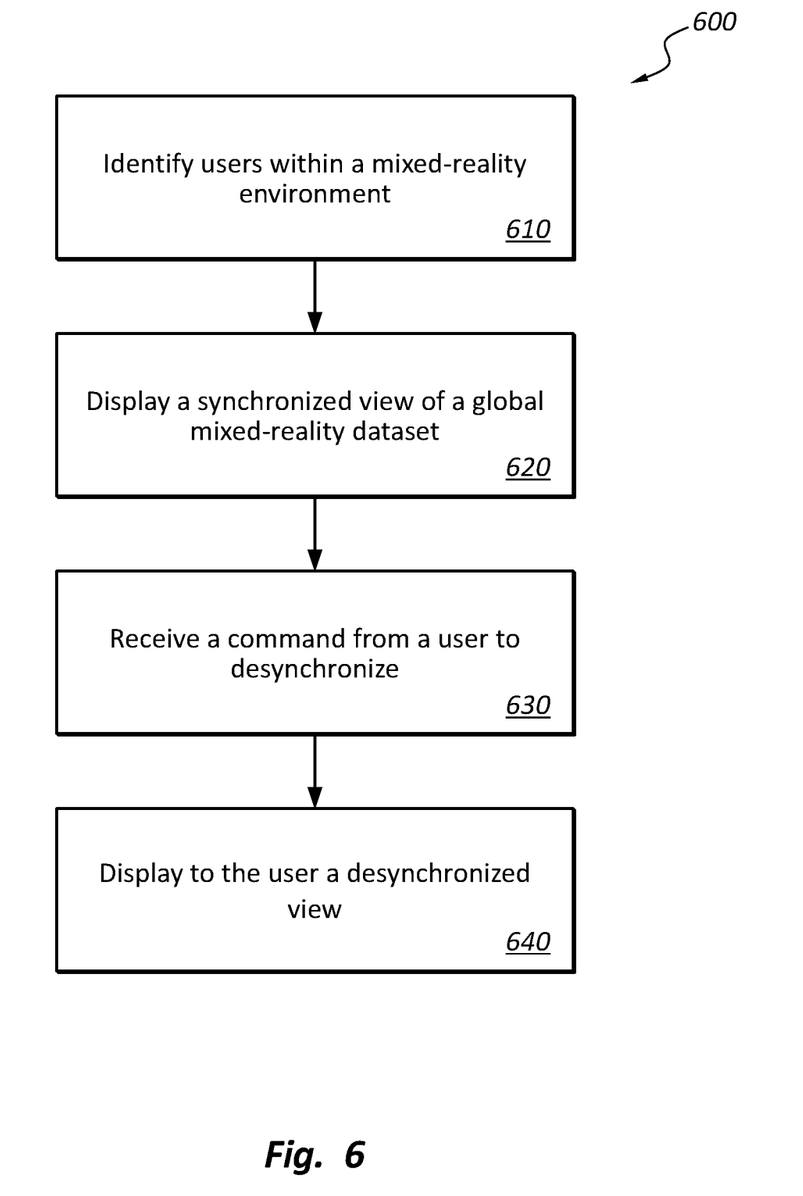
FIG. 6 illustrates a flowchart for an embodiment of a method for synchronizing and desynchronizing mixed-reality datasets between multiple devices.

FIG. 6 illustrates a flowchart for an embodiment of a method 600 for synchronizing and desynchronizing mixed-reality datasets between multiple devices. The method includes an act 610 of identifying users within a mixed-reality environment 610. Act 610 comprises identifying multiple users in a mixed-reality environment, wherein the mixed-reality environment is defined by a global mixed-reality dataset. For example, as depicted and described with respect to FIGS. 1 and 2, a mixed-reality computer system 100 identifies multiple users 230(a-d) within a mixed-reality environment 200. The users 230(a-d) are each associated with a mixed-reality device 180(a-d). The mixed-reality environment 200 is defined by a global mixed-reality dataset 112 that contains data and view variables 120(a-c) necessary to render the mixed-reality environment 100.

Method 600 also includes an act 620 of displaying a synchronized view of a global mixed-reality dataset. Act 620 comprises displaying a synchronized view of the global mixed-reality dataset to each of the multiple users within a shared coordinate system. For example, as depicted and described with respect to FIGS. 1-5, the mixed-reality computer system 100 displays to multiple users 230(a-d) a synchronized view of the global mixed-reality dataset 112. The synchronized view is displayed using a shared coordinate system that allows the users to collaboratively interact with the mixed-reality environment 200. Additionally, the shared coordinate system allows remote users 510 to also collaborate within a synchronized view of the mixed-reality environment 200.

Additionally, method 600 includes an act 630 of receiving a command from a user to desynchronize. Act 630 comprises receiving a command from a first user within the multiple users to desynchronize from the multiple users. For example, as depicted and described with respect to FIGS. 1 and 3, the mixed-reality computer system 100 receives a command from user 230b to desynchronize from the synchronized view of the mixed-reality global dataset 112.

Further method 600 includes an act 640 of displaying to the user a desynchronized view. Act 640 comprises displaying to the first user a first desynchronized view of the global mixed-reality dataset 112. For example, as depicted and described with respect to FIGS. 1 and 3, upon receiving the command from user 230b to desynchronize from the global mixed-reality dataset 112, the mixed-reality computer system 100 generates a first desynchronized mixed-reality dataset 114. The first desynchronized mixed-reality dataset 114 defines data and view variables 122(a-d) that are specific to the first desynchronized view of the global mixed-reality dataset 112. User 230b is then displayed a desynchronized view of the mixed-reality dataset 112. For instance, user 230b is displayed the three-dimensional map that includes tidal flows 300.

Accordingly, disclosed embodiments provide several technical improvements and solutions to problems relating to collaborative user interfaces within mixed-reality systems. Disclosed embodiments provide solutions and advancements for synchronizing and desynchronizing between shared global mixed-reality datasets. Additionally, disclosed embodiments provide solutions and advancements for sharing synchronized and desynchronized views of a mixed-reality environment between local and remote users. One will understand that the above listed improvements and solutions are merely exemplary and that one of skill in the art will appreciate additional significant improvements to the art that are taught herein.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for synchronizing and desynchronizing mixed-reality datasets between multiple devices comprising:
   one or more processors; and
   one or more computer-readable media having stored thereon executable instructions that when executed by the one or more processors configure the computer system to perform at least the following:
   identify multiple users in a mixed-reality environment, wherein the mixed-reality environment is defined by a global mixed-reality dataset;
   display a synchronized view of the global mixed-reality dataset to each of the multiple users within a shared coordinate system, wherein the shared coordinate system is simultaneously established in relation to at least a first tangible object within the physical environment of a first user of the multiple users and in relation to a different tangible object within the physical environment of at least one different user of the multiple users;
   receive a command from the first user to desynchronize from the multiple users;
   display to the first user a first desynchronized view of the global mixed-reality dataset, wherein the first desynchronized view is also displayed to the first user according to the shared coordinate system, wherein the first desynchronized view comprises a view of the global mixed-reality dataset, but with a capability of the first user to, independent from other synchronized users, for the global mixed-reality dataset, view additional data , view less data, view different data, or manipulate data; and
   display, within the mixed-reality environment, a visualization associated with the first user, wherein the visualization at least:
   indicates to at least one other user of the multiple users that the first user is desynchronized from the multiple users; and
   is rendered to correspond with the position of the first user within the mixed-reality environment.

2. The computer system of claim 1, wherein the first desynchronized view comprises a view of the global mixed-reality dataset with a different data filter than is seen by one or more synchronized users.

3. The computer system of claim 1, wherein:
   one or more attributes of the first desynchronized view are defined by settings for a set of view variables, and
   one or more attributes of the synchronized view are defined by different settings for the view variables.

4. The computer system of claim 1, wherein the executable instructions include instructions that are executable to configure the computer system to generate within the synchronized view the visual indication associated with the first user that indicates that the first user is in the desynchronized view such that as the first user moves within the mixed reality environment, the visual indication moves with the first user.

5. The computer system of claim 1, wherein the executable instructions include instructions that are executable to configure the computer system to generate within the synchronized view a visual indication associated a second user that indicates that the second user is in the desynchronized view.

6. The computer system of claim 1, wherein the synchronized view comprises a single visual control panel common to all users sharing the synchronized view.

7. The computer system of claim 1, wherein the executable instructions include instructions that are executable to:
   receive from the first user a command to manipulate a particular portion of the mixed-reality environment within the desynchronized view; and
   alter the first desynchronized view to reflect the manipulated data.

8. The computer system of claim 7, wherein the executable instructions include instructions that are executable to alter the global mixed-reality dataset to reflect the manipulated particular portion of the mixed-reality environment.

9. The computer system of claim 8, wherein the executable instructions include instructions that are executable to:
   before altering the global mixed-reality dataset, identify the particular portion of the mixed-reality environment; and
   lock variables within the global mixed-reality dataset that are associated with the particular portion of the mixed-reality environment from being edited by any user other than the first user.

10. The computer system of claim 8, wherein the executable instructions include instructions that are executable to:
    receive a command from the first user within the desynchronized view to resynchronize with the synchronized view; and
    display to the first user the synchronized view of the global mixed-reality dataset.

11. The computer system of claim 7, wherein the executable instructions include instructions that are executable to alter the synchronized view to reflect the manipulated particular portion of the mixed-reality environment.

12. The computer system of claim 1, wherein the executable instructions include instructions that are executable to:
    receive a command from a second user within the multiple users to synchronize with the first user; and
    display to the second user the first desynchronized view, wherein the first desynchronized view is shared with the second user and the first user.

13. The computer system of claim 12, wherein the executable instructions include instructions that are executable to:
    receive a command from the second user to manipulate a particular portion of the first desynchronized view.

14. The computer system of claim 12, wherein the executable instructions include instructions that are executable to:
    receive a command from a third user within the multiple users to desynchronize from the multiple users; and display to the third user a second desynchronized view of the global mixed-reality dataset, wherein the second desynchronized view is different than the first desynchronized view.

15. The computer system of claim 1, further comprising at least:
a first common anchor point associated with the first tangible object, wherein the first tangible object is within a room that contains at least a portion of the multiple users, and the shared coordinate system is associated with the first common anchor point; and
a second common anchor point associated with the second tangible object, wherein the second tangible object is within a different room that contains at least the different user and the shared coordinate system is simultaneously associated with the second common anchor point.

16. The computer system of claim 1, wherein the executable instructions include instructions that are executable to:
identify a first common anchor point within a first room that contains the multiple users;
identify a second common anchor point; and
display the synchronized view of the global mixed-reality dataset to the multiple users within the shared coordinate system, wherein the shared coordinate system for a first portion of the multiple users is associated with the first common anchor point and for a second portion of the multiple users is associated with the second common anchor point.

17. The computer system of claim 1, wherein the executable instructions include instructions that are executable to:
identify a remote user in the mixed-reality environment, wherein the mixed-reality environment is defined by the global mixed-reality dataset;
identify a second common anchor point within a second room that contains the remote user; and
display the synchronized view of the global mixed-reality dataset to the remote user within the shared coordinate system, wherein the shared coordinate system for the remote user is associated with the second common anchor point.

18. The computer system of claim 1, wherein multiple, different synchronized views are present simultaneously within the mixed-reality environment.

19. A method for synchronizing and desynchronizing mixed-reality datasets between multiple devices, comprising:
identifying multiple users in a mixed-reality environment, wherein the mixed-reality environment is defined by a global mixed-reality dataset;
displaying a synchronized view of the global mixed-reality dataset to each of the multiple users within a shared coordinate system;
receiving a command from a first user to desynchronize from the multiple users;
displaying to the first user a first desynchronized view of the global mixed-reality dataset, wherein the first desynchronized view is also displayed to the first user according to the shared coordinate system, wherein the first desynchronized view comprises a view of the global mixed-reality dataset, but with a capability of the first user to, independent from other synchronized users, for the global mixed-reality dataset, view additional data , view less data, view different data, or manipulate data; and
displaying, within the mixed-reality environment, a visualization associated with the first user, wherein the visualization at least:
indicates to at least one other user of the multiple users that the first user is desynchronized from the multiple users; and
is rendered to correspond with the position of the first user within the mixed-reality environment.

20. A computer program product comprising one or more computer-readable hardware storage device having stored thereon computer-executable instructions that, when executed at a processor, cause the computer system to perform a method for synchronizing and desynchronizing mixed-reality datasets between multiple devices, the method comprising:
identifying multiple users in a mixed-reality environment, wherein the mixed-reality environment is defined by a global mixed-reality dataset;
displaying a synchronized view of the global mixed-reality dataset to each of the multiple users within a shared coordinate system;
receiving a command from the first user to desynchronize from the multiple users; and
displaying to the first user a first desynchronized view of the global mixed-reality dataset, wherein the first desynchronized view is also displayed to the first user according to the shared coordinate system, wherein the first desynchronized view comprises a view of the global mixed-reality dataset, but with a capability of the first user to, independent from other synchronized users, for the global mixed-reality dataset, view additional data , view less data, view different data, or manipulate data; and
displaying, within the mixed-reality environment, a visualization associated with the first user, wherein the visualization at least:
indicates to at least one other user of the multiple users that the first user is desynchronized from the multiple users; and
is rendered to correspond with the position of the first user within the mixed-reality environment.

* * * * *